United States Patent [19]
Koch

[11] Patent Number: 5,331,314
[45] Date of Patent: Jul. 19, 1994

[54] CIRCUIT FOR MONITORING OF LOADS

[75] Inventor: Anton Koch, Elztal-Auerbach, Fed. Rep. of Germany

[73] Assignee: Temic Telefunken microelectronic GmbH, Heilbronn, Fed. Rep. of Germany

[21] Appl. No.: 841,416

[22] Filed: Feb. 26, 1992

[30] Foreign Application Priority Data

Mar. 8, 1991 [DE] Fed. Rep. of Germany ....... 4107415

[51] Int. Cl.$^5$ ............................................. G08B 21/00
[52] U.S. Cl. .................................. 340/661; 340/641; 340/642; 340/458; 307/10.8
[58] Field of Search ............... 340/458, 641, 642, 661; 307/10.8; 315/133, 134

[56] References Cited

U.S. PATENT DOCUMENTS

4,173,750 11/1979 Riba ............................... 340/642 X

FOREIGN PATENT DOCUMENTS

| | | |
|---|---|---|
| 2251881 | 4/1974 | Fed. Rep. of Germany . |
| 2731956 | 4/1978 | Fed. Rep. of Germany . |
| 2728229 | 1/1979 | Fed. Rep. of Germany . |
| 2741685 | 3/1979 | Fed. Rep. of Germany . |
| 3112314 | 10/1982 | Fed. Rep. of Germany . |
| 3244250 | 5/1984 | Fed. Rep. of Germany . |
| 3441015 | 5/1986 | Fed. Rep. of Germany . |
| 3531560 | 3/1987 | Fed. Rep. of Germany . |
| 2026174 | 1/1980 | United Kingdom . |
| 2034948 | 6/1980 | United Kingdom . |

OTHER PUBLICATIONS

U. Lachmann et al.: "Lampenüberwachung im Kraftfahrzeug" in Elektronik 23/Nov. 11, 1988, pp. 125–130.
M. Meakin: "Vielseitiger Komparator für Automobilanwendungen" in Elektronik 11/May 27, 1988, pp. 111–113.

*Primary Examiner*—Jeffery A. Hofsass
*Attorney, Agent, or Firm*—Spencer, Frank & Schneider

[57] ABSTRACT

A circuit is described for monitoring of loads having measuring resistors in the load circuit. The circuit evaluates the measuring voltage drops obtained at the measuring resistors. The circuit comprises at least one comparator stage made up of a reference current section and a comparator section. A temperature-dependent reference current is formed in the reference current section and supplied to the comparator section, with the temperature-dependent reference current comprising a voltage-independent component and a voltage-dependent component. The comparator section comprises one or more input branches, corresponding comparator branches, and a reference branch. The comparator branch compares the reference current flowing in the reference branch with the input currents flowing in the input branches and representing a measure for the measuring voltage drops obtained at the measuring resistors and applied to the inputs of the comparator stages. Depending on this comparison, a certain voltage level is emitted at the outputs of the comparator stages.

19 Claims, 2 Drawing Sheets

CIRCUIT FOR MONITORING OF LOADS

DESCRIPTION OF THE PRIOR ART

To monitor loads—for example to monitor lamp circuits with low beam, stop light or fog tail lamps—circuits are used that detect the current flow through the load, for example the lamps in the car, and indicate any defect.

This is achieved by incorporating a low-ohmic resistor (measuring) in the load unit circuit; the voltage obtainable at this resistor is evaluated and is used as an indication of the functioning of the load.

SUMMARY OF THE INVENTION

The object of the invention is to provide a monitoring circuit and method for monitoring loads of a load circuit, connectable to at least one measuring resistor, which is disposed in the load circuit and which has a corresponding measuring voltage drop.

The monitoring circuit comprises a reference current means for generating a single reference current which is temperature dependent and voltage dependent, wherein the single reference current includes a voltage dependent and a voltage independent component; at least one comparator means, connected to the reference current means to receive the single reference current and connectable to the at least one measuring resistor to measure the corresponding measuring voltage drop, each comparator means including a reference branch having a reference resistor and a reference voltage terminal, at least one input branch each having an input resistor and a measuring voltage terminal, and at least one comparator branch, each connected to the reference branch and to a respective input branch, and each comparator branch having an output terminal; means for connecting each measuring resistor between the reference voltage terminal and a respective measuring voltage terminal of a respective input branch in order to generate a respective input current flowing through the associated input resistor to produce a respective input voltage drop while the single reference current flows through the reference resistor to produce a reference voltage drop; and wherein each comparator branch compares the respective input voltage drop to the reference voltage drop by comparing the respective input current with the single reference current, and outputs a respective output voltage level at a respective output terminal as a result of the comparison.

The monitoring method comprises the steps of producing a single reference current which is temperature dependent and voltage dependent, wherein the single reference current includes a voltage dependent and a voltage independent component; supplying the single reference current to a reference resistor, an input resistor, and a current comparator branch; inputting a measuring voltage drop of the measuring resistor by coupling the measuring resistor between a reference voltage terminal and a measuring voltage terminal to produce an input current through the input resistor to generate an input voltage drop while the single reference current flows through the reference resistor to produce a reference voltage drop; comparing the respective input voltage drop to the reference voltage drop by comparing the reference current to the input current; and producing a comparison output as an output voltage level at an output terminal.

The circuit in accordance with the invention combines a number of advantages:

The comparator stage, which compares the voltage obtained at the measuring resistor with a reference voltage, comprises only one comparator section and one reference current section; furthermore, a checking section can be provided for switching off the load monitoring means.

The comparator stages can evaluate voltages at their inputs that are higher than the supply voltage of the comparators.

The comparator section of the comparator stage is supplied by only one reference current.

This reference current is temperature-dependent, so no expensive temperature stabilization circuitry is required for the circuit.

The threshold value of the comparator stage and hence the response threshold in load monitoring can be preset as required using the reference current or by the dimensioning of the resistors.

The entire comparator stage can be integrated into an integrated circuit; various comparator stages can be supplied from the same reference current section.

BRIEF DESCRIPTION OF THE DRAWINGS

The circuit in accordance with the invention is described in greater detail on the basis of FIGS. 1 and 2, showing a circuit for monitoring of the lamp circuits in motor vehicles.

DESCRIPTION OF A PREFERRED EMBODIMENT

Figure 1:
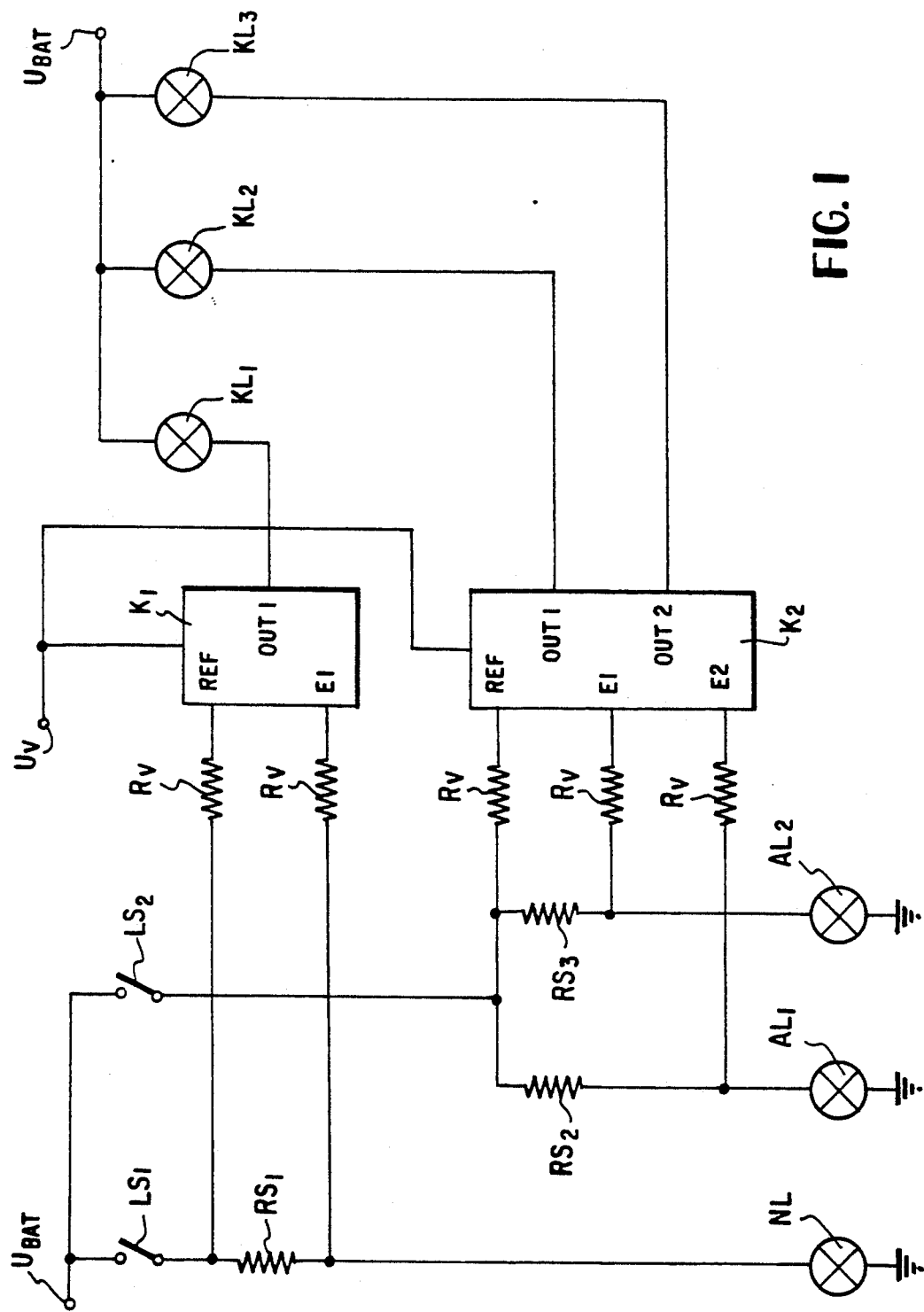
FIG. 1 is the principle circuit diagram and FIG. 2 is an embodiment of a circuit of this type.

FIG. 1 shows the design principle of a lamp circuit in motor vehicles using the example of a fog tail lamp NL and two low beam lamps $AL_1$ and $AL_2$. The lamps are supplied from the vehicle's battery—whose voltage $U_{Bat}$ can fluctuate typically between 10 V and 15 V—using lamp switches $LS_1$ and $LS_2$; Low-ohmic measuring resistors $RS_1$ or $RS_2$, $RS_3$ are disposed between the lamp switches $LS_1$ and $LS_2$ and the lamps NL and $AL_1$, $AL_2$. The voltage available at the measuring resistors is evaluated by the two comparator stages $K_1$ and $K_2$:

The input $E_1$ of the single comparator stage $K_1$ is supplied with the voltage between the resistor $RS_1$ and the fogtail lamp NL; as the input signal, and the input REF with the voltage between the resistor $RS_1$ and the lamp switch $LS_1$ as the input signal, in both cases the voltage is supplied via a series resistor $R_V$; i.e. the single comparator stage $K_1$ compares the voltage obtained at the resistor $RS_1$ with an internal reference voltage correspondingly, the two inputs $E_1$ and $E_2$ of the double comparator stage $K_2$ are supplied with the voltage between the resistors $RS_2$, $RS_3$ and their respective low beam lamps $AL_1$, $AL_2$ as the input signal, and the input REF with the voltage in between the resistors $RS_2$, $RS_3$ and their lamp switch $LS_2$ as the input signal, in both cases the voltage is supplied via a series resistor $R_V$; i.e. the double comparator stage $K_1$ compares—the voltage obtained at the resistors $RS_2$, $RS_3$ with an internal reference voltage.

At the outputs $OUT_1$, $OUT_2$ of the two comparator stages $K_1$ and $K_2$, pilot lights $KL_1$, $KL_2$ and $KL_3$ can be connected for ascertaining the status of the lamps NL, $AL_1$, $AL_2$. If one or more of the lamps NL, $AL_1$, $AL_2$ is defective, there is no voltage drop at the appropriate measuring resistor $RS_1$, $RS_2$, $RS_3$, so that the input voltages at the inputs of the comparator stage are of equal size. This information is processed by the comparator stage, a characteristic output signal is emitted at the outputs $OUT_1$, $OUT_2$, and the appropriate pilot light $KL_1$, $KL_2$ and $KL_3$ is actuated. If the voltage $U_{REF}$ at the reference input REF of the comparator stages $K_1$ and $K_2$ drops below a certain limit value, for example 3 V—this is used as an indication that the lamp switch $LS_1$, $LS_2$ is open and the comparator stages $K_1$ and $K_2$ are switched off which means that the lamps are no longer monitored. The voltage obtained at the measuring resistors $RS_1$, $RS_2$, $RS_3$ is typically in the order of 10 mV. The response threshold of the comparator stages is based on this value. The response threshold depends on the supply voltage $U_V$ or battery voltage $U_{Bat}$ (in the case where $U_{Bat}=U_V$). In the case of a higher lamp voltage or battery voltage $U_{Bat}$, the voltage drop rises at the measuring resistors $RS_1$, $RS_2$, $RS_3$, consequently the response threshold too rises with a positive voltage curve.

Figure 2:
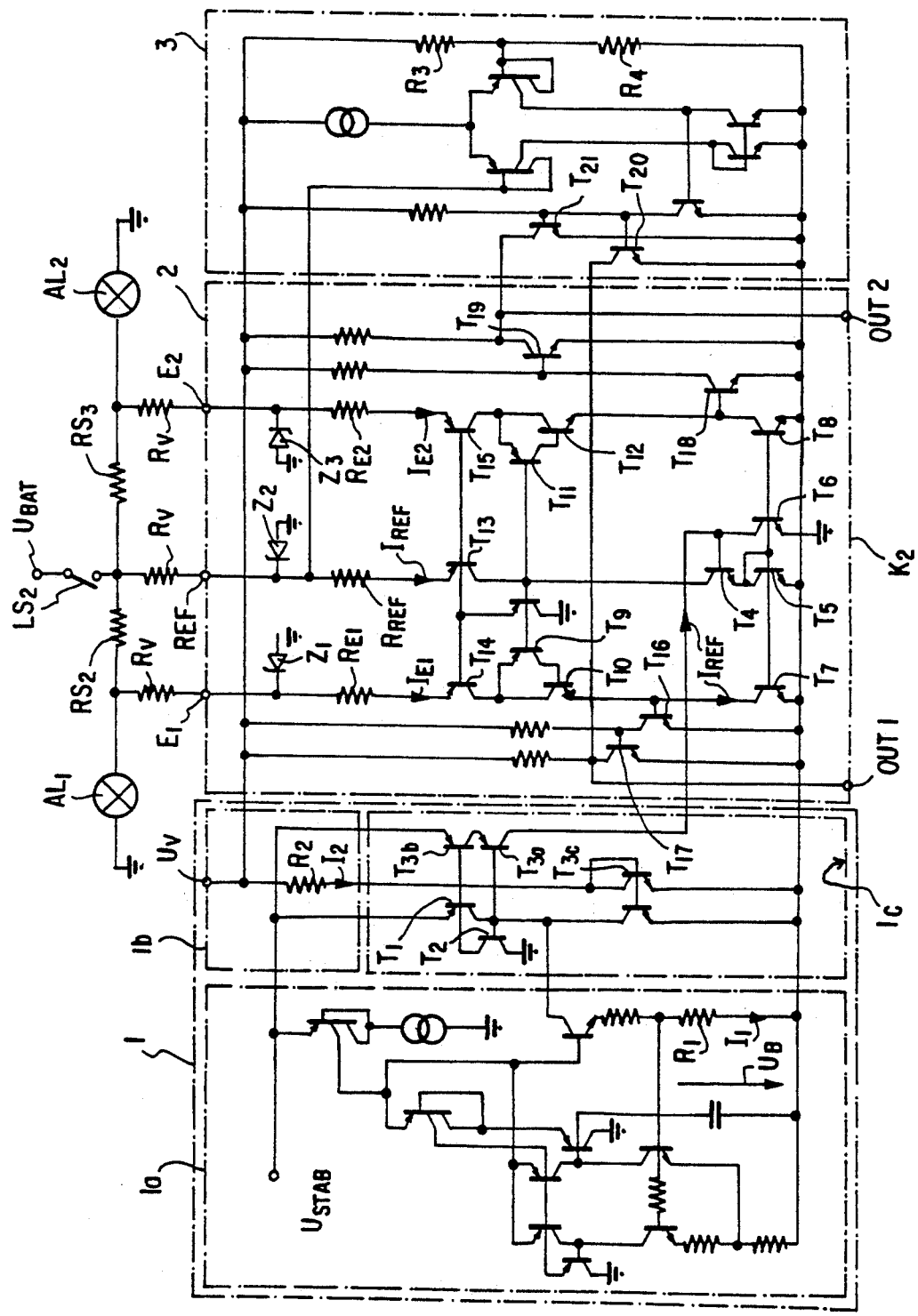

FIG. 2 is an embodiment for the portion of the circuit diagram of FIG. 1 containing the double comparator stage $K_2$ for the low beam lamps $AL_1$, $AL_2$ of a motor vehicle. The lamps are connected via the lamp switch $LS_2$ to the battery voltage $U_{Bat}$. The voltages between the low beam lamps $AL_1$, $AL_2$ and the shunt resistors $R_2$, $R_3$ and between the lamp switch $LS_2$ and the measuring resistors $RS_2$, $RS_3$ are supplied as an input signal to the two inputs $E_1$, $E_2$ and to the reference input REF of the comparator stage $K_2$ respectively. The two outputs of the double comparator stage $K_2$ are—as shown in FIG. 1—identified as $OUT_1$ and $OUT_2$. The reference current $I_{Ref}$ for setting the response threshold of the comparator stage is generated by the reference current section 1. The reference current $I_{Ref}$ is comprised of the two parts $I_1$ and $I_2$ with $I_{Ref}=I_1+I_2$.

The current $I_1$ is formed by the conventional bandgap circuit 1a, which is supplied by a stabilized voltage $U_{STAB}$, from the temperature-independent band-gap voltage $U_B$ and the resistance $R_1$ where $I_1=U_B/R_1$. Since the resistance $R_1$ is temperature-dependent, $I_1$ also depends on the temperature. Since the voltage $U_B$ is independent of the supply voltage $U_V$ of the circuit, $I_1$ is also independent of $U_V$.

The current $I_2$ is formed in the circuit section 1b by the resistance $R_2$ connected to the supply voltage $U_V$ so that $I_2=(U_V-U_{BE})/R_2$ where $U_{BE}$ is the flow voltage of the transistor $T_{3c}$. On account of the temperature dependent resistance $R_2$, $I_2$ is dependent both on the temperature and on the supply voltage $U_V$.

The two currents $I_1$ and $I_2$ are added together in the circuit section 1c by the current mirror consisting of transistors $T_1$, $T_2$, $T_{3a}$ and $T_{3b}$, giving the temperature-dependent reference current $I_{Ref}$ with which the response threshold of the comparator section 2 is adjusted:

$$I_{Ref}=U_B/R_1+(U_V-U_{BE})/R_2 \qquad (1)$$

The reference current $I_{Ref}$ is supplied to the comparator section 2 via a current mirror, with the reference current $I_{Ref}$ being mirrored by the transistors $T_4$, $T_5$ and $T_6$ in the reference branch of the comparator section 2 to transistor $T_{13}$ or to the transistors $T_{14}$, $T_{15}$, by the transistor $T_7$ in the first input branch and by the transistor $T_8$ in the second input branch of the comparator section 2. The transistors $T_9$, $T_{10}$ or $T_{11}$, $T_{12}$ are used for compensation of the early voltage, so that the response threshold set with the reference current $I_{Ref}$ is independent of the voltages applied at the inputs $E_1$, $E_2$, REF of the comparator stage $K_2$. Currents $I_{E1}$ and $I_{E2}$ are generated by the input resistors $R_{E1}$ and $R_{E2}$—dependent on the voltage applied at the inputs $E_1$ and $E_2$ respectively—and compared with the current $I_{Ref}$ formed by the reference resistor $R_{REF}$, which is the emitter resistor of transistor $T_{13}$. The voltage difference $\Delta U$ between the reference input REF and the two inputs $E_1$ or $E_2$ is therefore respectively:

$$\Delta U=(R_{REF}-R_{E1})\cdot I_{Ref}, \text{ or } \Delta U=(R_{REF}-R_{E2})\cdot I_{Ref} \qquad (2)$$

In conjunction with the equation (1), this gives the following result:

$$\Delta U=(R_{REF}-R_{E1})/R_1\cdot U_B+(R_{REF}-R_{E1})/R_2\cdot(U_V-U_{BE}) \qquad (3)$$

The voltage difference $\Delta U$ is composed in accordance with equation (3) of a temperature-independent and supply voltage-independent component forming the absolute part of the response threshold, and of a supply-voltage-dependent component providing the required voltage curve. The response threshold of the comparator stage $K_2$ or of the comparator section 2 can be set and varied in accordance with equation (2) using the difference between the resistances $R_{E1}$, $R_{E2}$ and the reference resistance $R_{Ref}$ or using the reference current $I_{Ref}$. Since the resistors $R_1$, $R_2$ and $R_{E1}$, $R_{E2}$, $R_{Ref}$ have the same temperature coefficients, the response threshold of the comparator stage is independent of the temperature. The inputs of the comparator stage $K_2$ are protected against excessive voltages and at the same time against electrostatic discharges by the series resistors $R_V$ and the zener diodes $Z_1$, $Z_2$, $Z_3$. The series resistors $R_V$ must be of equal size so that they do not affect the response threshold of the comparator stage $K_2$.

Various operating states of the lamps are recognized and evaluated by the circuit:

With a defective lamp $AL_1$ ($AL_2$), the same voltage is applied to the inputs $E_1$ ($E_2$) and REF of the comparator section 2. Since the resistance $R_{E1}$ ($R_{E2}$) is lower than the reference resistance $R_{Ref}$—for example $R_{E1}$ ($R_{E2}$)=400 ohms and $R_{Ref}=800$ ohms—the current $I_{E1}$ ($I_{E2}$) is greater than the reference current $I_{Ref}$. The current $I_{E1}$ ($I_{E2}$) flowing to the base of the transistor $T_{16}$ ($T_{18}$) is accordingly greater than the current $I_{Ref}$ flowing from it, so that the transistor $T_{16}$ ($T_{18}$) is switched on and the transistor $T_{17}$ ($T_{19}$) is blocked. There is therefore high potential at the output $OUT_1$ ($OUT_2$) of the comparator section 2, which is an indication of a defective lamp.

If the lamp $AL_1$ ($AL_2$) is in order (not defective), the voltage at the input $E_1$ ($E_2$) of the comparator section 2 according to equation (2) is lower than the voltage at the input REF by the voltage difference $\Delta U$. The current $I_{Ref}$ is in this case greater than the current $I_{E1}$ ($I_{E2}$), so more current flows from the base of the transistor $T_{16}$ ($T_{18}$) than is supplied to it. The transistor $T_{16}$ ($T_{18}$) is blocked and the transistor $T_{17}$ ($T_{19}$) is switched on. Accordingly, low potential is applied to the output $OUT_1$ ($OUT_2$) of the comparator section 2, which is an indication of a functioning lamp. The voltage difference $\Delta U$ is for example 10 mV, with this numerical value being adjustable in accordance with equation (2) using the difference of the resistances $R_{Ref}-R_{E1}$ ($R_{E2}$) or using the reference current $I_{Ref}$. The response threshold of the comparator rises in accordance with equation (3) as a function of the supply voltage $U_V$—for example by 0.47 mV per volt.

The switch settings of the lamp switches $LS_1$, $LS_2$ and dependable switch-off of the lamp switches $LS_1$, $LS_2$ is monitored by the checking section 3. When the voltage $U_{Ref}$ at the comparator input REF falls short of a certain value $U_{Refmin}$, for example 2 V, the circuit outputs $OUT_1$ and $OUT_2$ are switched off and monitoring no longer takes place. The voltage $U_{Refmin}$ is set by the checking section 3 using a voltage divider comprising the resistors $R_3$ and $R_4$. If the reference voltage $U_{Ref}$ is lower than the minimum voltage $U_{Refmin}$, the transistors $T_{20}$ and $T_{21}$ switch on, hence transistor $T_{20}$ switches output $OUT_1$ to low potential, and transistor $T_{21}$ switches output $OUT_2$ to low potential.

The entire comparator stage can be integrated into an integrated circuit, with a reference current section and several comparator sections being provided for monitoring several loads or lamps. The inputs of the comparator section and the connection for the supply voltage $U_V$ can be provided as connecting pins, while the outputs of the comparator section are switched to output drivers functioning as further connecting pins. Depending on the voltage at the output pins, it is possible to detect which of the loads or lamps is defective. Typical applications for the circuit are current monitoring of loads, switching on/off of loads in the event of excessive current, switching off of DC motors in the event of overload, checking of short-circuit capacity or use as a short-circuit cutout, and glow plug monitoring in diesel engines.

What is claimed is:

1. A monitoring circuit for monitoring loads of a load circuit, with the monitoring circuit being connectable to at least one measuring resistor which is disposed in the load circuit and which has a corresponding measuring voltage drop, the monitoring circuit comprising:
   a reference current means for generating a single reference current which is temperature dependent and voltage dependent, wherein the single reference current includes a voltage dependent and a voltage independent component;
   at least one comparator means, connected to the reference current means, to receive the single reference current and connectable to the at least one measuring resistor to measure the corresponding measuring voltage drop, each comparator means including a reference branch having a reference resistor and a reference voltage terminal, at least one input branch each having a respective input resistor and a measuring voltage terminal, and at least one comparator branch, each connected to the reference branch and to a respective input branch, and each comparator branch having an output terminal;
   means for connecting each measuring resistor between the reference voltage terminal and a respective measuring voltage terminal of a respective input branch in order to generate a respective input current flowing through the associated input resistor to produce a respective input voltage drop while the single reference current flows through the reference resistor to produce a reference voltage drop; and
   wherein each comparator branch compares the respective input voltage drop to the reference voltage drop by comparing the respective input current with the single reference current, and outputs a respective output voltage level at the respective output terminal as a result of the comparison.

2. A circuit according to claim 1, wherein the reference current means has a first current section comprising a band-gap circuit connected in series to a first resistor to generate the voltage independent component of the single reference current.

3. A circuit according to claim 2, wherein the reference current means has a second circuit section comprising a second resistor connected to a supply voltage to generate the voltage dependent component of the single reference current.

4. A circuit according to claim 3, wherein the reference current means has a third circuit section, connected to the first current section, the second current section and the at least one comparator means, comprising a first plurality of transistors arranged in a current mirror configuration to add the voltage independent and voltage dependent components to produce the single reference current.

5. A circuit according to claim 1, wherein the reference branch of the comparator means further comprises a plurality of transistors arranged in a current mirror configuration which supply the single reference current to the at least one comparator branch.

6. A circuit according to claim 1, wherein the reference resistor has a resistance value which is greater than the resistance values of each respective input resistor.

7. A circuit according to claim 6, wherein each comparator branch further comprises a comparing transistor connected to an output transistor, wherein the comparing transistor compares the respective input current corresponding to a voltage drop across the respective input resistor with the single reference current corresponding to a voltage drop across the reference resistor and wherein the output transistor is actuated by the comparing transistor depending on the results of the current comparison to output the respective output voltage level at the respective output terminal.

8. A circuit according to claim 7, wherein a response threshold of each input branch of the comparator means is set by adjusting the value of at least one of the reference current and the difference between the resistance value of the reference resistor and the resistance value of the respective input resistor.

9. A circuit according to claim 8, wherein the response threshold of each input branch of the at least one comparator means has a positive voltage curve in that the response threshold varies directly in relation to a supply voltage of the comparator means.

10. A circuit according to claim 3, wherein the first resistor, second resistor, reference resistor, and each respective input resistor have the same temperature curve.

11. A circuit according to claim 1, further comprising a checking means, connected to the at least one comparator means, that terminates monitoring of the load when the value of the voltage at the reference voltage terminal falls below a minimum voltage value.

12. A circuit according to claim 11, wherein the checking means has a voltage divider coupled in parallel to a plurality of switching transistors, wherein the minimum voltage value is set using resistor values of the resistors in the voltage divider, and wherein the output terminals of the comparator branches are switched off by the plurality of switching transistors when the value of the voltage at the reference voltage terminal is less than the minimum voltage value.

13. A circuit according to claim 1, wherein said means for connecting each measuring resistor comprises a respective series resistor connected to the reference voltage terminal and to each of the measuring voltage terminals; wherein a respective Zener diode is connected between the reference voltage terminal and ground and is connected between each of the measuring voltage terminals and ground; and wherein the respective series resistors and respective Zener diodes serve as a protection from excessive voltages.

14. A circuit according to claim 1, wherein the output terminals are each connectable to a respective pilot light that is actuated depending on the output voltage level at the respective output terminal.

15. A circuit according to claim 1, wherein the monitoring circuit is integrated in an integrated circuit.

16. A circuit according to claim 1, wherein the single reference current of the reference current means is supplied to a plurality of comparator means.

17. A circuit according to claim 1, wherein the reference current means has a circuit section comprising a resistor connected to a supply voltage to generate the voltage dependent component of the single reference current.

18. A method for monitoring loads of a load circuit, in which a measuring resistor is disposed in the load circuit, comprising the steps of:
   producing a single reference current which is temperature dependent and voltage dependent, wherein the single reference current includes a voltage dependent and a voltage independent component;
   supplying the single reference current to a reference resistor, an input resistor, and a current comparator branch;
   inputting a measuring voltage drop of the measuring resistor by coupling the measuring resistor between a reference voltage terminal and a measuring voltage terminal to produce an input current through the input resistor to generate an input voltage drop while the single reference current flows through the reference resistor to produce a reference voltage drop;
   comparing the input voltage drop to the reference voltage drop by comparing the reference current to the input current; and
   producing a comparison output as an output voltage level at an output terminal.

19. A monitoring circuit for monitoring loads of a load circuit, with the monitoring circuit being connectable to at least one measuring resistor which is disposed in the load circuit and which has a corresponding measuring voltage drop, the monitoring circuit comprising:
   a reference current means for generating a single reference current which is temperature dependent and voltage dependent, wherein the single reference current includes a voltage dependent and a voltage independent component;
   at least one comparator means, connected to the reference current means, to receive the single reference current and connectable to the at least one measuring resistor to measure the corresponding measuring voltage drop, each comparator means including a reference branch having a reference voltage terminal, at least one input branch each having a measuring voltage terminal, and at least one comparator branch, each connected to the reference branch and to a respective input branch, and each comparator branch having an output terminal;
   a checking means, connected to the at least one comparator means, that terminates monitoring of the load when the value of the voltage at the reference voltage terminal falls below a minimum voltage value, said checking means including a voltage divider coupled in parallel to a plurality of switching transistors, wherein the minimum voltage value is set using the resistor values of the resistors in the voltage divider, and wherein the output terminals of the respective comparator branches are switched off by the switching transistors when the value of the voltage at the reference voltage terminal is less than the minimum voltage value;
   means for connecting each measuring resistor between the reference voltage terminal and a respective measuring voltage terminal of a respective input branch in order to generate a respective input current flowing through the respective input branch while the single reference current flows through the reference branch;
   wherein each comparator branch compares the respective input current with the single reference current, and outputs a respective output voltage level at a respective output terminal as a result of the comparison.

* * * * *